United States Patent
Becherucci et al.

(10) Patent No.: US 6,349,895 B1
(45) Date of Patent: Feb. 26, 2002

(54) CHANGEABLE FLYER

(75) Inventors: Raffaele Becherucci, Florence; Gianfranco Stratico, Siena; Gianni Mazzoni, Foggibonsi; Maurizio Mugelli, San Gimignano, all of (IT)

(73) Assignee: Axis USA, Inc., Tampa, FL (US)

( * ) Notice: Subject to any disclaimer, the term of this patent is extended or adjusted under 35 U.S.C. 154(b) by 0 days.

(21) Appl. No.: 09/441,269

(22) Filed: Nov. 16, 1999

Related U.S. Application Data (60) Provisional application No. 60/109,141, filed on Nov. 20, 1998.

(51) Int. Cl.$^7$ ................................. H02K 15/09
(52) U.S. Cl. ..................................... 242/433.3
(58) Field of Search ............... 242/433, 433.3, 242/433.4

(56) References Cited

U.S. PATENT DOCUMENTS

| | | | |
|---|---|---|---|
| 3,006,564 A | 10/1961 | Hambleton | 242/13 |
| 3,076,613 A * | 2/1963 | Turk | 242/433.3 |
| 3,924,816 A * | 12/1975 | Schubert et al. | 242/433.3 |
| 4,915,313 A | 4/1990 | Banner et al. | 242/7.05 |
| 5,100,071 A | 3/1992 | Hongo et al. | 242/7.05 |

FOREIGN PATENT DOCUMENTS

JP    52-76601    * 12/1975    ............. 242/433.3

OTHER PUBLICATIONS

Patent Abstracts of Japan, Pub. No. 07059308, Mar. 3, 1995.
Patent Abstracts of Japan, Pub. No. 63257440, Oct. 25, 1988.

* cited by examiner

Primary Examiner—Katherine A. Matecki
(74) Attorney, Agent, or Firm—Fish & Neave; Brajesh Mohan (57) ABSTRACT

A system for simplifying the design of winding guides is provided. The flyer arm of a winder built in accordance with the principles of this invention is positioned so that the extreme delivery point of the wire is aligned and practically over the slots of the armature where the coil is being wound. Additionally, the flyer arm can be easily and quickly substituted on the winder to conform to the armature being wound, ensuring that the extreme delivery point of the wire is aligned and practically over the slots of the armature where the coil is being wound. This feature of the invention contributes to a simpler design of the winding guide. Accordingly, traditional guide surfaces for capturing the wire coming from a distant position are no longer required.

24 Claims, 6 Drawing Sheets

CHANGEABLE FLYER

CROSS REFERENCE TO RELATED PATENT APPLICATION

This application claims the benefit of commonly-assigned U.S. Provisional Patent Application No. 60/109,141, filed Nov. 20, 1998.

BACKGROUND OF THE INVENTION

This invention relates to machines for winding armatures for electric motors and the like. In particular, this invention relates to winding guides that are used to guide the wire leaving a flyer so that the wire is aligned and deposited within slots of the armature stack, and to apparatus for facilitating changing of the flyer which dispenses wire coming from a supply reel.

Winding guides have been used in the past to guide wire leaving a flyer such that the wire becomes aligned and deposited within the slots of the armature stack. More particularly, the wire leaving the rotating flyer is caught by such guides and runs on their appropriately configured and machined surfaces to reach alignment with the slot entrances where the coils need to be wound. Following the alignment, the wire is drawn into the slots where it is deposited as a portion of the coil. Examples of such winding guides have been described in U.S. Pat. Nos. 5,257,745 and 4,579,291, both assigned to the assignee of this application and hereby incorporated by reference in their entirety.

The above-described winding guides have a relatively complex spatial configuration, particularly since their configuration is governed by the configuration of the armature that needs to be wound. Consequently, designing of the winding guides of the prior art requires dedicated trial and error.

In view of the foregoing, it is an object of the invention to provide solutions for simplifying the complex spatial configuration of winding guides.

It is another object of the invention to provide solutions for avoiding the configuration of the winding guide to be dependent on the configuration of the armature that needs to be wound.

It is another object of the invention to reduce the manual adaptations which need to be accomplished for manufacturing winding guides.

It is another object of the invention to reduce the geometrical extent of the winding guide, thereby reducing the amount of wire running on the guide surface.

It is another object of the invention to provide solutions for obtaining the best winding position for winding armatures.

It is another object of the invention to improve the operation required to connect the coil leads to the tangs of the commutator.

SUMMARY OF THE INVENTION

These and other objects of the invention are accomplished in accordance with the principles of the invention by providing a system for simplifying the design of winding guides.

According to the principles of the invention, a support member acts as a reference surface to maintain the position of the armature during winding. The support member impedes lateral deflection of the armature.

The flyer arm of the winder built in accordance with the principles of this invention is positioned so that the extreme delivery point of the wire is aligned and practically over the slots of the armature where the coil is being wound. This is in direct contrast with the flyer arms of the prior art. In the prior art, the flyer arm was positioned away from the armature being wound and traditional guide surface were utilized to capture the wire from a far away position. Accordingly, only simple guide structures need to be employed to maintain wire alignment with the opening of the slots.

Additionally, in accordance with the principles of this invention, the flyer arm can be easily and quickly substituted on the winder in accordance with the armature being wound, ensuring that the extreme delivery point of the wire is aligned and practically over the slots of the armature where the coil is being wound. This feature of the invention contributes to a simpler design of the winding guide.

Accordingly, traditional guide surfaces for capturing the wire coming from a distant position are no longer required. Instead, a simplified guide surface is used in accordance with the principles of this invention.

The guide structure built in accordance with the principles of the invention has a leading surface that maintains the alignment of the wire with the opening of the slot. The flyer arm is positioned with respect to the guide structure in such a manner that the wire is slightly deflected against. This deflection maintains the alignment of the wire with the position of the flyer as well as the slot of the armature being wound, enabling a more secure deposition of wire in the slots.

BRIEF DESCRIPTION OF THE DRAWINGS

The above and other objects and advantages of the invention will be more apparent upon consideration of the following detailed description of the preferred embodiments, taken in conjunction with the accompanying drawings, in which like reference characters refer to like elements throughout, and in which.

DETAILED DESCRIPTION OF THE PREFERRED EMBODIMENTS

In the illustrative embodiment shown in FIGS. 1–4, an armature 11 to be wound is held and shielded by shield assembly 20. Armature 11 is wound by means of at least wire 14, delivered by flyer arm 10. Flyer arm 10 rotates on circular orbit F about axis B in order to wind coils of wire on armature 11 in corresponding slots, for example, 11' and 11". Armature 11 is positioned coaxial to axis A of the shield tubes belonging to shield assembly 20.

Shield assembly 20 can be like the equipment described in U.S. Pat. No. 5,127,594, which is hereby incorporated by reference herein. Shield assembly 20 can also be like the equipment described in commonly-assigned U.S. Pat. application Ser. No. 09/323,304, filed Jun. 1, 1999 which claims priority from U.S. provisional application No. 60/090,394, filed Jun. 23, 1998, which are both hereby incorporated by reference herein.

Axis B is perpendicular to axis A and, in a preferred embodiment, their intersection is the center of the armature stack. Wire 14 leaving flyer arm 10 is deposited for a predetermined number of turns in slots, for example, 11' and 11", to form a coil. The coil spans between corresponding slots, for example, 11' and 11" along both ends of the lamination stack.

In the prior art, winding guides were mounted on structure 18. In accordance with an illustrative embodiment of this invention, V support member 19 is attached to structure 18 to act as a reference surface to maintain the position of armature 11 during winding. Support member 19 impedes a lateral deflection of armature 11.

Guide structure 21 is maintained in position by means of support rod 32 (fixed to a face of guide structure 21). Support rod 32 stems from releasable bracket 33 clamped on the external tube of the shield assembly. Aperture 34 in guide structure 21 allows the gripper and cutter (not shown) used in the winder for terminating the leads to become adjacent to the tangs for their respective operations.

These operations, which can be traditional, will grip the final leads of the coils and cut them to free the armature. Flyer arm 10 is positioned with respect to guide structure 21 in such a manner that wire 14 is slightly deflected against it (toward the center of armature 11). This deflection maintains wire 14 against guide structure 21.

Guide structure 21 comprises of surface 21' and leading surface 21". Surface 21' is slightly inclined toward the center of armature 11 such that it merely represents an edge that maintains the alignment of wire 14 with the opening of a slot, for example 11'. Leading surface 21" captures any slight misalignments of wire 14, for example, when the orbit of the flyer is winding one end of the external portions of the coils, to bring the wire into an end opening of slot 11'. Leading surface 21" is also inclined toward the center of armature 11.

Leading surfaces 21' of guide structure 21 maintains the alignment of wire 14 with the opening of the slot, for example 11'. As described before, flyer arm 10 is positioned with respect to guide structure 21 in such a manner that wire 14 is slightly deflected against guide structure 21. This deflection maintains the alignment of wire 14 with the position of flyer arm 10 as well as the slot of the armature being wound, for example 11'.

One of the advantages of having wire 14 deflected against leading surface 21' of guide structure 21 is that wire 14 can be better aligned with the slots, for example 11' and 11", of armature 11 being wound. This alignment with the slots of armature 11 being wound assists in the winding of wire 14 not only with respect to the opening of the slots, for example 11' and 11", of armature 14, but also with the shape of the slots. Thus, this feature of the invention enables a more secure winding of wire 14, thereby preventing wire laid within slots from climbing up. It will be understood that climbing of the wire up the side of the slot is undesirable because it impedes wire from being wound at the bottom of the slot, thereby reducing slot fill.

A corresponding guide structure, similar to the above-described guide structure 21, is also applied near corresponding slot 11". This corresponding guide structure achieves wire alignment for corresponding slot 11" and maintains it during flyer rotations. The leading surface of the corresponding guide structure (similar to leading surface 21" of guide structure 21) is positioned adjacent to the corresponding end of armature 11, indicated as 01 in FIG. 2, which is opposite to where leading surface 21' of guide structure 21 has been shown (see end indicated as 02 in FIG. 2).

The leading surface of the corresponding guide structure is positioned adjacent to the corresponding end of armature 11 (indicated as 01 in FIG. 2) because wire 14 has to be led into slot 11" from end 01, while for slot 11', wire 14 is led in from end 02. This is consistent with the direction R (FIG. 1) of rotation of flyer arm 10 about axis B. However, it will be understood that if the direction of rotation of the flyer arm 10 were to be reversed, the positioning of the leading surfaces of guide structure 21 and its corresponding guide structure would also have to be reversed.

Figure 2:
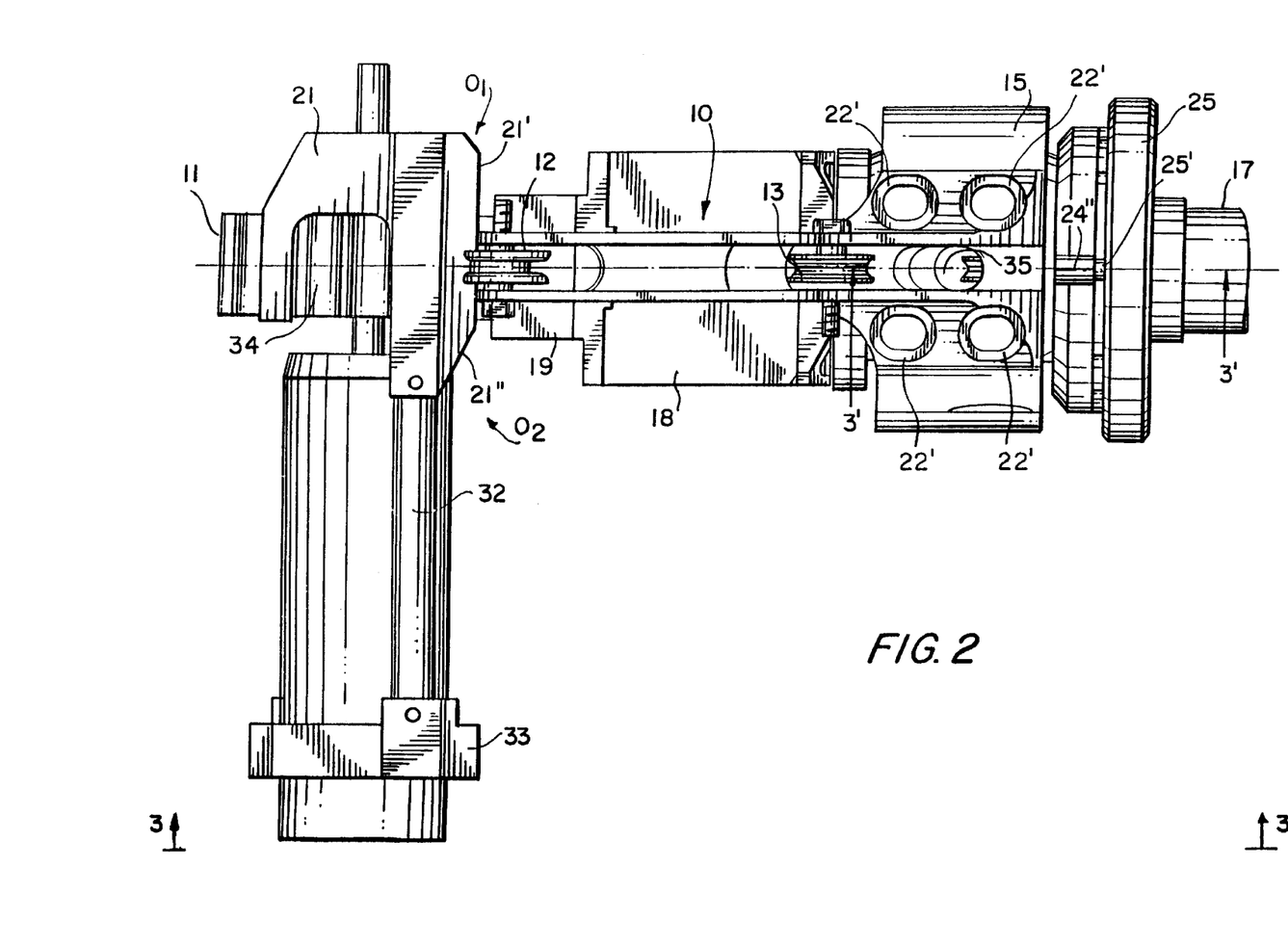
FIG. 2 is a top view of an illustrative winder constructed in accordance with the principles of this invention taken generally along the line 2—2 in FIG. 1.
Figure 3:
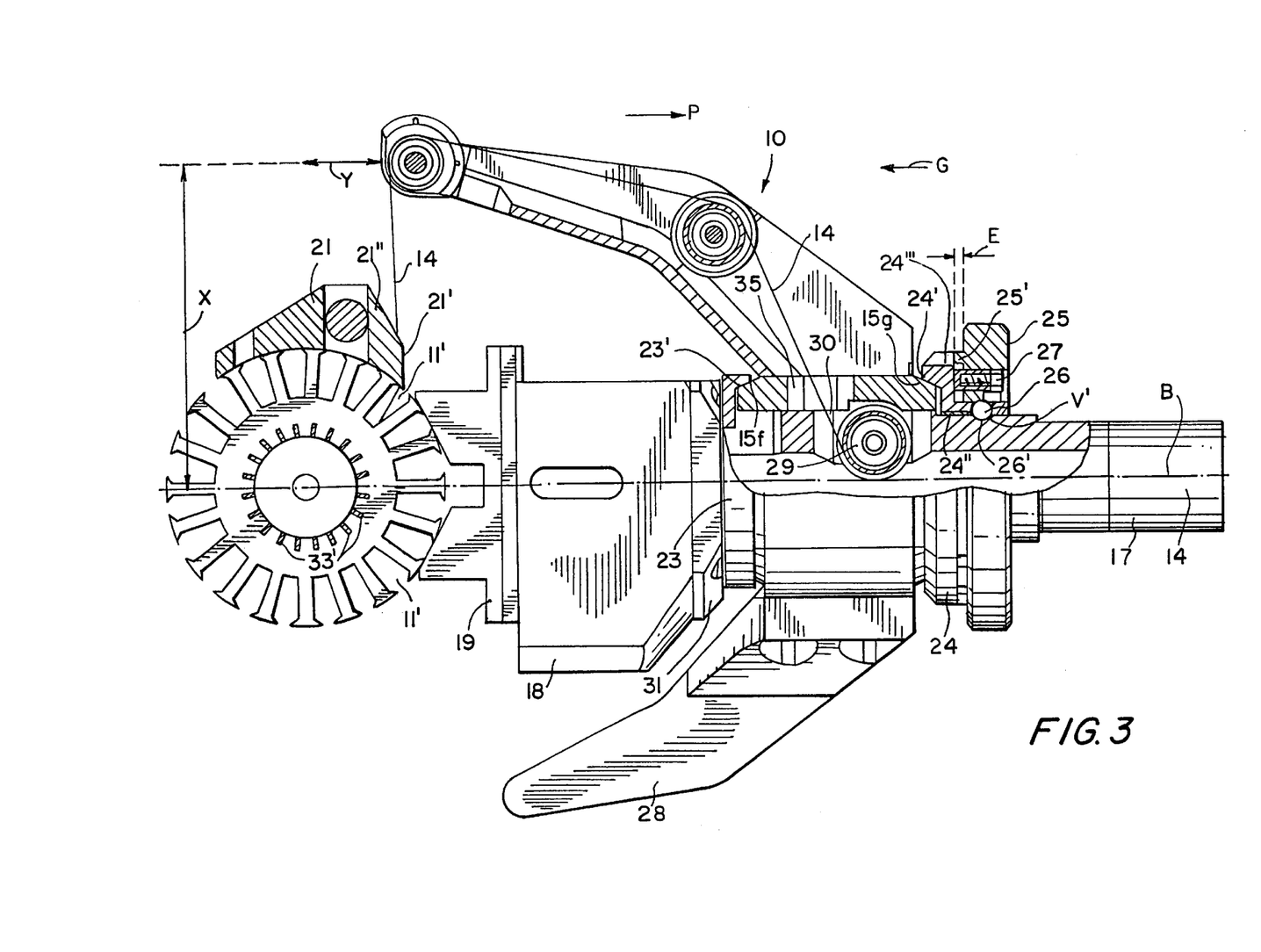
FIG. 3 is a simplified view of an illustrative winder constructed in accordance with the principles of this invention taken generally along the line 3—3 in FIG. 2. Also shown in FIG. 3 is the simplified partial sectional view taken generally along the line 3'—3' in FIG. 2.

FIG. 3 is a simplified view of an illustrative winder constructed in accordance with the principles of this invention taken generally along the line 3—3 in FIG. 2. Also shown in FIG. 3 is the simplified partial sectional view taken generally along the line 3'—3' in FIG. 2.

As shown in FIG. 3, flyer arm 10 has been positioned so that its extreme wire delivery point, pulley wheel 12 (FIG. 2), is at distances X and Y (X-measured along an axis perpendicular to axis B about which the flyer rotates; and Y-measured along an axis parallel to axis B about which the flyer rotates) from the center of armature 11 being wound. In accordance with the principles of this invention, distances X and Y are chosen to align orbit F (FIG. 1) over the slots, for example, 11' and 11", where wire 14 is being wound. Thus, in accordance with the invention, flyer arm 10 is so positioned that the extreme wire delivery point of flyer 10 is dimensionally within a diameter distance of armature 11 being wound. It will, however, be understood that flyer arm 10 can be positioned in any other manner to suit the operation being performed, for example, by varying the X and Y coordinates.

In accordance with the principles of this invention, even the distance from the extreme wire delivery point of flyer arm 10 to the slots, for example, 11' and 11", is very small. Accordingly, traditional guide surfaces for capturing the wire coming from a far away position (like area P) are no longer required. In accordance with the principles of this invention, only simple guide structures like 21 need to be employed.

In accordance with an illustrative embodiment of this invention, flyer arm 10 can be easily and quickly substituted on a winder to adopt the best values of distances X and Y for winding a particular armature configuration. Accordingly, flyer arm 10 can be used as a tool that can be changed on a winder by a motor manufacturer to best suit the disposition and size of the slots that need to be wound. Thus, a motor manufacturer can change flyer arm 10 easily and quickly each time for a different batch of armatures having corresponding configurations. The geometrical measurement of the flyer arm is the fundamental characteristic that achieves the needed measurements of X and Y. The geometrical measurement of flyer arm 10 can also be used to distinguish each flyer arm, in the sense of it being a tool.

Figure 1:
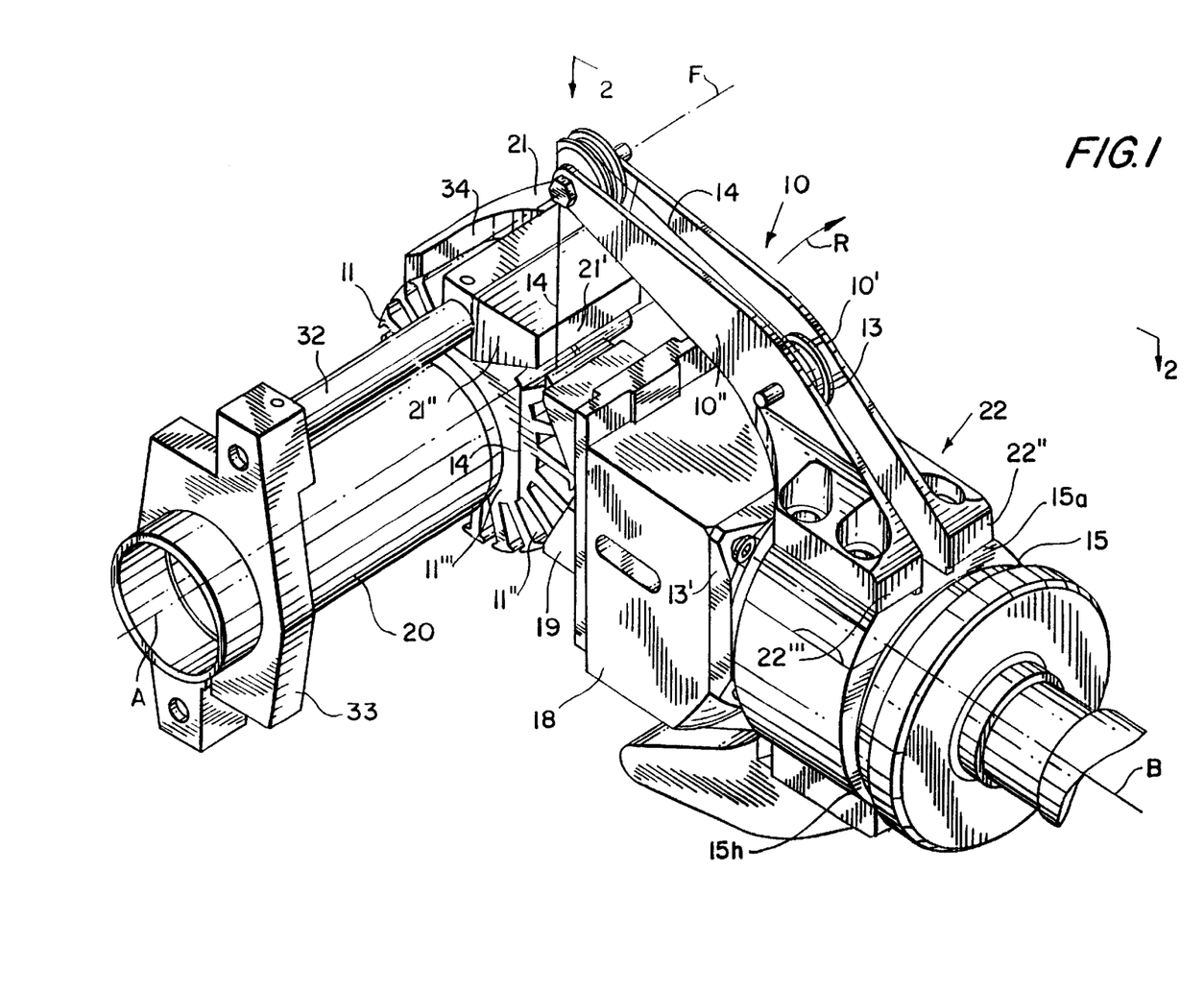
FIG. 1 is an isometric view of an illustrative winder constructed in accordance with the principles of this invention.

As shown in FIG. 1, flyer arm 10 is formed from two separate arms 10' and 10". The spacing between arms 10' and 10''' is required to receive pulley wheels 12 and 13, and to allow passage of wire 14. Flyer arm 10 is provided with base structure 22 on an end opposite to pulley wheel 12. Base structure 22 is bolted to plane 15a of collar 15 by means of bolts passing through passageways 22' (FIG. 2). Base structure 22 is formed by securing base structures 22'' and 22''', corresponding to arms 10' and 10'', respectively, a certain distance apart to plane 15a of collar 15 by means of bolts passing through passageways 22' (FIG. 2).

Figure 4:
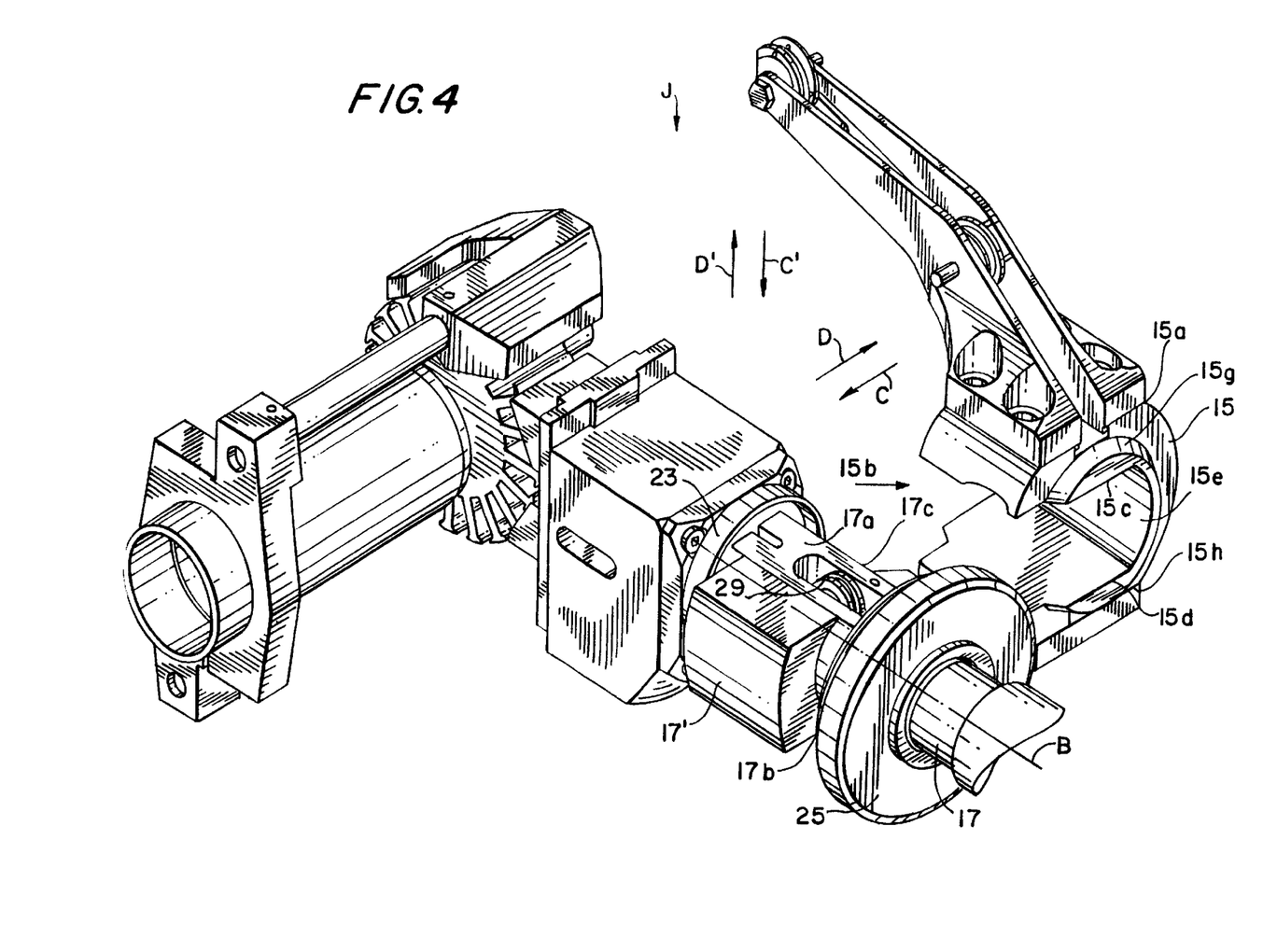
FIG. 4 is a partly exploded, isometric view of an illustrative winder constructed in accordance with the principles of this invention.

FIG. 4 is a partly exploded, isometric view of an illustrative winder constructed in accordance with the principles of this invention. In FIG. 4, the flyer arm assembly has been removed from the winder assembly in accordance with an illustrative embodiment of this invention. Collar 15 of the flyer assembly has a circular form with an opening 15b. The inside of collar 15 has two opposite parallel planes 15c and 15d. Portion 15e is circular and connects plane 15c to plane 15d.

Shaft member 17 of the winder assembly is provided with two opposite parallel planes 17a and 17b. Part of planes 17a and 17b are formed by extension 17', which is a portion protruding from shaft member 17. As shown in FIG. 4, flyer arm 10 can be mounted on the winder by aligning opening 15b with the portion of shaft member 17 which is delimited by planes 17a and 17b. This has to occur on the side of shaft member 17 which is opposite to extension 17'.

Once the above-described alignment has been reached, flyer arm 10 can be moved in direction C, i.e., perpendicularly to shaft member 17 to make planes 15c and 15d slide on planes 17a and 17b, respectively. This movement will end when circular portion 15e abuts against corresponding circular portion 17c, which is opposite to extension 17'. It will be understood that flyer arm 10 can be easily removed from the winder by moving it in direction D, which is opposite to direction C. This movement in direction D will cause planes 15c and 15d to slide off planes 17a and 17b, respectively.

As shown in FIG. 3, and with particular reference to the sectioned portion, as seen from directions 3' and 3' of FIG. 2, shaft member 17 is encircled by two rings 23 and 24. Ring 23 is fixed to shaft member 17, while ring 24 is capable of rotating around axis B (ring 24 has an internal threaded portion so that it will thread on to threaded portion 24'' of shaft member 17). The inside of rings 23 and 24 are provided, respectively, with internal cone surfaces 23' and 24' which are opposite to each other, and coaxial with respect to axis B (when rings 23 and 24 have been mounted on shaft 17). Ring 24 is provided with external slits 24''', placed at equiangular distances from each other around axis B.

Ring 25 is mounted on a rear cylindrical extension of ring 24, and is able to rotate around axis B. A number of balls, for example, like ball 26, are mounted through respective bores of the rear cylindrical extension of ring 24. These balls support the rotation of ring 25. Individual V-shaped seats, for example, like seat 26', for seating a respective ball are present on shaft 17. Ring 25 is also provided with bores parallel to axis B for receiving spring biased plungers 27. Plungers 27 maintain rings 24 and 25 apart, for example, by maintaining distance E. In doing so, the edges of the bores where balls 26 are received, push on balls 26 to engage them against sides V' of V-shaped seats, for example, 26'. When this occurs, a locking action is obtained between rings 24 and 25 that impedes any relative rotations between rings 24 and 25 around axis B, and that also impedes any movement of ring 25 off the rear extension of ring 24.

The use of this locking action will become more apparent from the following. Ring 25 is provided with extensions 25' placed at equal angular distances from each other around axis B. The angular distances between slits 24''' and extensions 25' are the same. Extensions 25' are aligned with the slits by turning ring 25. Subsequently, extensions 25' are received in slits 24''' by moving ring 25 in direction G. Once extensions 25' have been received in slits 24''', ring 25 can be rotated around axis B causing ring 24 to also rotate around axis B. This occurs because extensions 25' engage the side walls of slits 24'''. With the rotating of ring 25, ring 24 will move axially on thread 24'' in direction G, or oppositely to direction G, depending on the direction ring 24 is turned.

Flyer arm 10 is provided with opposite cone surfaces 15f and 15g. When flyer arm 10 has been mounted on shaft member 17(as described above), cone surface 15f can be made to engage complementary recess portion 24' in ring 24 by moving ring 24 axially in direction G (through rotation of ring 25, as described above). This movement in direction G will first engage and center cone surface 15f with complementary recess portion 24' and then bring them to mate precisely. This is possible because, simultaneously, cone surface 15f and corresponding complementary recess portion 23' in ring 23 will also become centered and mate between themselves. The presence of thread 24'' on shaft member 17 secures this final mating condition at a certain force created when turning ring 25. Accordingly, plane 15c will be clamped against plane 17a, and plane 15d will be clamped against plane 17b, thereby securing flyer arm 10 to shaft member 17.

It will be understood that the hand of a human can turn ring 25 to achieve these operations. It will also be understood that although for illustration purposes ring 25 is used to attain axial displacement of ring 24 relative to ring 23 in order to secure flyer arm 10 to the winder assembly, other mechanisms can be employed to achieve the desired axial displacement of ring 24.

In the above-described manner, flyer arm 10 can be secured to the winder in a predetermined position to achieve the required distances X and Y, as shown in FIG. 3. Once ring 25 is no longer held by the hand of the operator, plungers 27 will move ring 25 in a direction opposite to G, removing extensions 25' from slits 24'''. This movement will be stopped by engagement of the inside of ring 25 with balls 26. Any tendency of ring 24 to unloosen on thread 24'' is impeded by this engagement with the balls. This engagement with balls 26 is counter reacted by engagement of balls 26 with inclined sides V' of V seat 26'.

Counter arm 28 is also part of flyer arm 10 and is bolted to plane 15h of collar 15. Plane 15h is opposite and parallel to plane 15a. Counter arm 28 is used to counter the centrifugal forces of flyer arm 10.

Flyer arm 10 can be easily and quickly removed by turning ring 25 opposite to the direction used above to secure flyer arm 10, and by moving flyer arm 10 in direction D (FIG. 4). One hand of the human operator can turn ring 25, and the other hand can grasp flyer arm 10 and withdraw it in direction D.

Alternatively, the flyer arm can be rotated, prior to its substitution, so that directions C and D become C' and D', respectively (at 90° to C and D). In this rotated condition, the flyer arm can be removed toward the upper area of the winder where access for the human operator is more convenient.

Shaft member 17 needs to be hollow to allow the passage of wire 14 coming from a traditional wire drum and wire tensioner. Pulley wheel 29 is mounted in slot 30 of shaft member 17 and is required for directing wire 14 to pulley wheels 12 and 13. Slot 30 (FIG. 3) is open on plane 17a for allowing passage of wire 14 to reach pulley wheels 12 and 13. Slot 35 is also present on collar 15 to allow passage of wire 14 to pulley wheels 12 and 13. Structure 18 is connected to the end of shaft member 17 by flange/bolt connection 31.

The armature holding device of shield assembly 20 can be turned (in order to index the armature) by means of traditional equipment not shown. Similarly, it will be understood that shaft member 17 can be turned (in order to rotate the flyer) by traditional equipment not shown.

Indexing of armature 11 is required for aligning other slots with guide structure 21 when moving on to wind further coils by means of the flyer arm. Indexing of armature 11 is also required for positioning tangs 33' of the commutator in relation to the flyer when the coil leads need to be formed. These coil leads are connected to the tangs by a combination of flyer rotations and indexing of armature 11, as accomplished in the prior art.

However, as described earlier, in accordance with the principles of this invention, the distance from the extreme wire delivery point of flyer arm 10 to the slots, for example, 11' and 11", is very small. Accordingly, it is possible to draw wire 14 directly around the tang without the use of guide equipment like the traditional hooking plate that was applied to the side of structure 18. Indexing of armature 11 to bring tangs 33' in flyer orbit F can assist in this connection of coil leads to tangs 33'.

Figure 5:
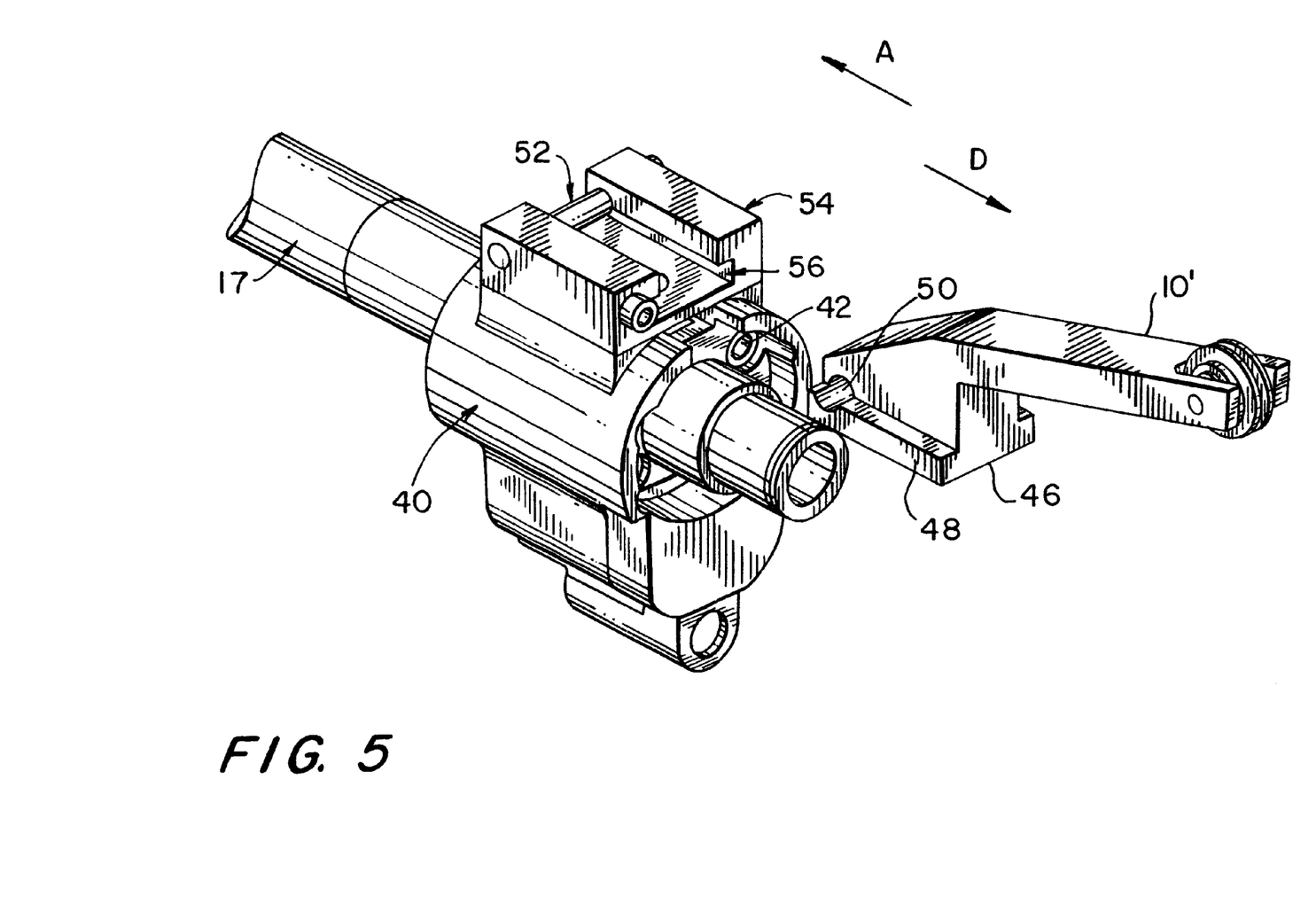
FIG. 5 is a partial, partly exploded, isometric view of an alternative illustrative embodiment of a winder in constructed in accordance with this invention.

FIG. 5 is a partial, partly exploded, isometric view of an alternative illustrative embodiment of a winder constructed in accordance with the invention. In accordance with the illustrative embodiment of this invention depicted in FIG. 5, the winder comprises hub 40 which is concentrically displaced along shaft 17. Shaft 17 has an outwardly extending flange (not shown) to which hub 40 is bolted to, for example, by bolt 42. Shaft 17 extends past hub 40 to buttress support member 19 (not shown) which acts as a reference surface to maintain the position of the armature during winding (as described earlier in reference to FIGS. 1–5).

Flyer arm 10' constructed in accordance with the embodiment of the invention illustrated in FIG. 5, has a base portion 46 which has laterally spaced extensions 48. Base portion 46 also has a bore 50 at its distal end for receiving locking pin 52. Hub 40 has a rectangular or prismatic shaped sleeve 54 which is designed to receive base portion 46 of flyer arm 10'. Sleeve 54 has a removable locking pin 52 on its distal end which is removed prior to sliding in base portion 46 of flyer arm 10'. Extensions 48 of base portion 46 slide into complementary recesses 56 in sleeve 54 which receive corresponding extensions 48 to form a snug fit.

In order to attach the flyer arm assembly to the winder assembly, locking pin 52 is removed from sleeve 54 of hub 40. Thereafter, extensions 48 of base 46 of flyer arm 10' are slid in direction A into corresponding complementary recesses 56. Subsequent to sliding extensions 48 of base portion 46 of flyer arm 10' into corresponding complementary recesses 56, locking pin 52 is slid back into place and is received by bore 50 in the distal end of base portion 46 of flyer arm 10', thereby securing flyer arm 10' to hub 40.

It will be understood that for disassembling flyer arm 10' from hub 40, locking pin 52 would have to be extracted from bore 50 in the distal end of base portion 46 of flyer arm 10', and flyer arm 10' would be slid in direction D, i.e., opposite to direction A, thereby disassembling flyer arm 10' from hub 40.

Figure 6:
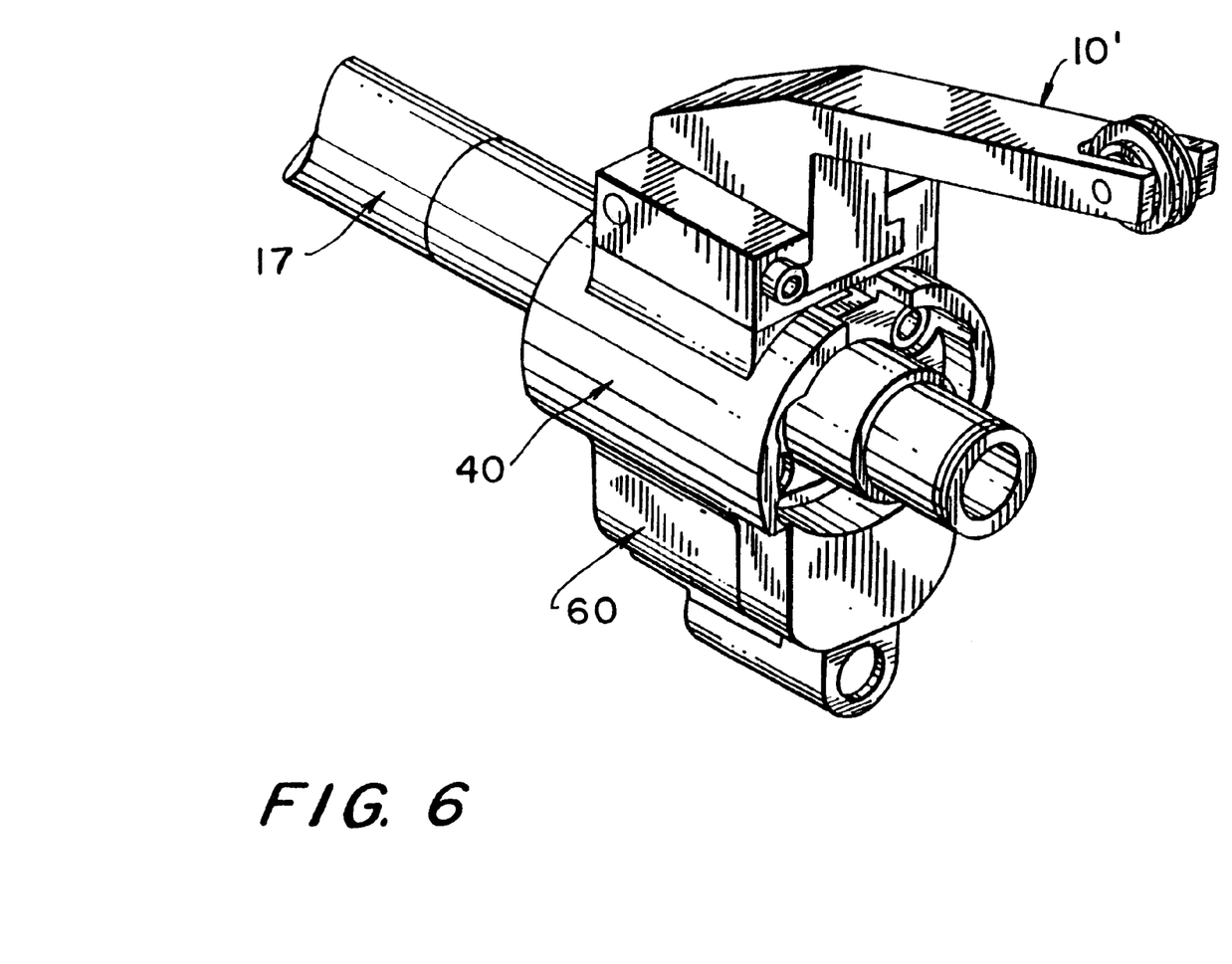
FIG. 6 is partial isometric view of an alternative illustrative winder constructed in accordance with the principles of this invention.

FIG. 6 is partial isometric view of the alternative illustrative winder constructed in accordance with the principles of this invention and also illustrated in FIG. 5. In the illustrative embodiment shown in FIG. 6, flyer arm 10' is shown mounted on to hub 40. Also shown in FIG. 6 is counterweight 60. Counterweight 60 is used to counter balance the centrifugal forces created by the rotation of flyer arm 10' during the winding process of armature 11 (not shown).

In a preferred embodiment in accordance with the principles of this invention, counterweight 60 is manufactured to counter balance the centrifugal force generated by the heaviest flyer arm 10'. However, in the event lighter flyer arms are used in place, for example, to achieve a certain X, Y attribute specific to the configuration of an armature, mass can be added to the, for example, base of the lighter flyer arm such that the centrifugal forces created by the weighed flyer arm equals that of counter weight 60. This mass could be, for example, added in a bore within the base of the lighter flyer arm.

Although not illustrated, it will, however, be understood that flyer arm 10' comprises a passage (similar to flyer arm 10) for receiving wire 14 (not shown) from the winder assembly (not shown).

Although the principles of this invention have been illustrated by showing the winder equipped with only one flyer arm 10 for winding one slot at a time, it will be understood that the principles of this invention can be duplicated, and used on the opposite side of the armature to achieve winding of two armature at the same time. In such a case, guide structures like 21 will have surfaces like 211 and 21" for operating with both flyers.

It will also be understood that for winding operations at low speeds of rotation of flyer arm 10 (which has been changed to obtain ideal distances X and Y), wire alignment with the slots being wound is not as critical. In such instances, guide structures like 21 may be eliminated.

It will also be understood that the foregoing is only illustrative of the principles of the invention, and that various modifications can be made by those skilled in the art without departing from the scope and spirit of the invention. The described embodiments are presented for the purpose of illustration rather than limitation, and the present invention is limited only by the claims which follow.

The invention claimed is:

1. Apparatus for simplifying the spatial configuration of winding guides used in a winder to align and deposit wire from a flyer arm in slots of an armature comprising:
    a support member for maintaining the position of the armature during winding;
    a guide structure for maintaining said wire's alignment, wherein said guide structure comprises a leading surface for maintaining alignment of said wire with said slots; and
    a flyer arm assembly wherein said flyer arm assembly's extreme wire delivery point is horizontally and vertically displaced from said armature's center, wherein said flyer arm assembly is held firmly relative to said winder by a winder assembly, but is also readily removable and replaceable from said winder assembly by a releasable locking apparatus, wherein removing and replacing of said flyer arm assembly from said winder assembly is done to substitute said flyer arm assembly with another flyer arm assembly having horizontal and vertical displacement values corresponding to a particular armature, wherein said values for said horizontal and vertical displacements position said another flyer arm assembly's extreme wire delivery point in close proximity to said slots of said armature being wound.

2. The apparatus defined in claim 1 wherein said flyer arm is positioned with respect to said guide structure to cause said wire to be deflected against said guide structure.

3. The apparatus defined in claim 1 wherein said guide structure comprises:
   a first surface inclined inwards toward said armature's center for maintaining said wire's alignment with said slot's opening; and
   a second surface for capturing misalignments of said wire and bringing said wire into said slot's opening.

4. The apparatus defined in claim 1 wherein said flyer arm assembly comprises:
   a flyer arm having opposite cone surfaces, said flyer arm having a base structure secured to a collar, wherein said collar has an opening defined by vertically displaced horizontally parallel planes connected by a vertical semi-circular portion at a distal end.

5. The apparatus defined in claim 1 wherein said winder assembly comprises:
   a shaft member having two vertically displaced horizontally parallel planes connected by a vertical semi-circular portion congruent to said semicircular portion at a distal end of a collar, wherein said opening of said collar can be aligned and abutted with said congruent semi-circular portion of said vertically displaced horizontally parallel planes of said shaft; and
   a locking apparatus for securing said abutment of said opening of said collar and said congruent semi-circular portion of said vertically displaced horizontally parallel planes of said shaft.

6. The apparatus defined in claim 5 wherein said locking apparatus comprises:
   a first vertical ring horizontally displaced along said shaft's axis bordering a proximal end of said vertically displaced horizontally parallel planes, said first ring having a frustoconical projection surface coaxial with respect to said shaft's axis; and
   a second vertical ring horizontally displaced along said shaft's axis bordering said distal end of said vertically displaced horizontally parallel planes, said second ring having a frustoconical projection surface coaxial with respect to said shaft's axis, wherein said frustoconical projection surface of said first ring is opposite to said frustoconical projection surface of said second ring and said frustoconical projection surfaces of said first and second ring are complementary to corresponding cone surfaces of said flyer arm, wherein axial movement of said second ring toward said first ring causes said opposite cone surfaces of said flyer arm to engage complementary said corresponding frustoconical surfaces of said first and second rings thereby abutting said flyer arm assembly to said winder assembly.

7. The apparatus defined in claim 6 wherein said locking apparatus further comprises a third vertical ring mounted on a rear extension of said second ring, said third ring having extensions at equiangular distances from each other around said shaft's axis, wherein said extensions are aligned to and received by similarly spaced external slits on said second ring upon movement of said third ring toward said second ring, wherein after engagement of said second ring to said third ring, rotation of said third ring causes relative rotation of said second ring along said shaft's axis causing said second ring to move axially toward said first ring.

8. The apparatus defined in claim 7 further comprises means for securing said third ring when extensions of said third ring are no longer engaging said slits in said second ring thereby impeding said third ring from rotations around said shaft's axis.

9. The apparatus defined in claim 8 wherein said means for securing comprises:
   a plurality of balls mounted in respective bores in said second ring's cylindrical extension, said cylindrical extension positioned in a direction away from said first ring along said shaft's axis, wherein said balls support said third ring's rotation around said shaft's axis; and
   a plurality of seats for seating a respective one of said plurality of balls, wherein said plurality of seats are circumferentially displaced along said axis's shaft.

10. The apparatus defined in claim 9 wherein upon force being withdrawn from pushing said third ring toward said second ring said plurality of seats engage a corresponding one of said plurality of balls thereby impeding any relative movement between said second ring and said third ring.

11. The apparatus defined in claim 7 wherein upon axial movement of said third ring in a direction away from said second ring, said flyer assembly can be slid out of said winder assembly.

12. The apparatus defined in claim 1 wherein said flyer arm assembly comprises a flyer arm having a base portion with laterally spaced extensions.

13. The apparatus defined in claim 12 wherein said winder assembly comprises a hub, said hub being radially displaced along said winder's shaft and having a prismatic shaped sleeve designed for receiving said laterally spaced extensions of said base portion.

14. The apparatus defined in claim 13 wherein said laterally spaced extensions of said base portion are received by said hub's prismatic sleeve and secured by a locking means.

15. The apparatus defined in claim 13 wherein said winder assembly further comprises a counterweight for balancing centrifugal forces generated by rotation of said flyer arm assembly.

16. Apparatus for mounting a flyer arm assembly on a winder assembly for winding wire in slots of an armature so that said flyer arm assembly is held firmly relative to said winder assembly but is also readily removable from said winder assembly comprising:
   a first reference surface on said flyer arm assembly;
   a second reference surface on said winder assembly, wherein said first reference surface of said flyer arm assembly is complementary with said second surface of said winder assembly, whereby said first reference surface on said flyer arm assembly is releasably coupled with said second reference surface of said winder assembly for releasably mounting said flyer arm assembly on said winder assembly; and
   means for releasably locking and unlocking said first reference surface and said second reference surface for mounting and dismounting, respectively, said flyer arm assembly on said winder assembly.

17. The apparatus defined in claim 16 wherein said first reference surface on said flyer arm assembly partially envelopes said second reference surface on said winder assembly, thereby enabling said first reference surface on said flyer arm assembly to slide on and off said second reference surface on said winder assembly.

18. The apparatus defined in claim 16 wherein said releasably locking means enable quick mounting and dismounting of said flyer arm assembly on and off, respectively, said winder assembly without having to dismantle said flyer arm assembly.

19. The apparatus defined in claim 16 wherein said flyer arm assembly used in said winder to wind wire in slots of said armature is selected such that said flyer arm assembly's extreme wire delivery point is aligned with said slot of said armature being wound.

20. The apparatus defined in claim 16 wherein said first reference surface on said flyer arm assembly comprises a base portion with means for releasably coupling said first reference surface on said flyer arm assembly with said second reference surface on said winder assembly.

21. The apparatus defined in claim 20 wherein said means for coupling comprises laterally spaced lips that slide into corresponding complementary grooves in said second reference surface, thereby enabling said first reference surface on said flyer arm assembly to slide on and off said second reference surface.

22. The apparatus defined in claim 20 wherein said first reference surface on said flyer arm assembly is releasably coupled with said second reference surface on said winder assembly by a locking means.

23. The apparatus defined in claim 20 wherein said locking means comprises a locking pin that releasably couples said first reference surface on said flyer assembly and said second reference surface on said winder assembly.

24. The apparatus defined in claim 16 wherein said winder assembly further comprises a counterweight for balancing centrifugal forces generated by rotation of said flyer arm assembly.

* * * * *